Jan. 18, 1927.
H. N. PACKARD
1,614,535
MEANS FOR INDICATING AND ALSO RECORDING VARIOUS VALUES
Filed Feb. 5, 1921
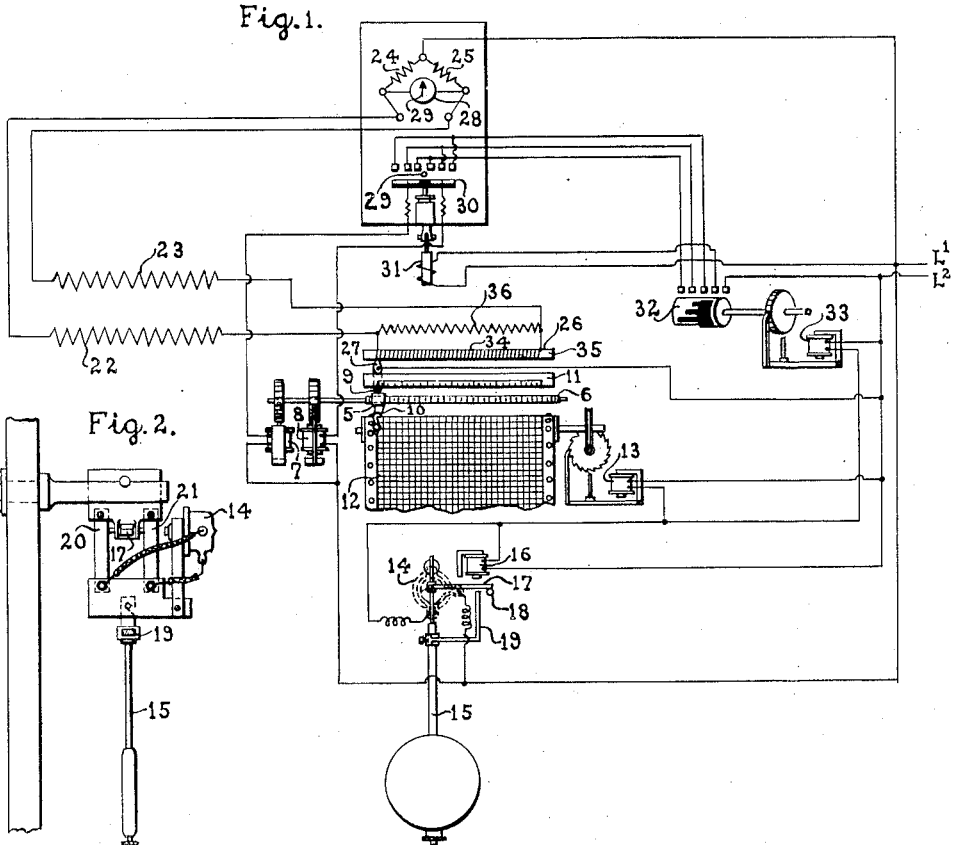
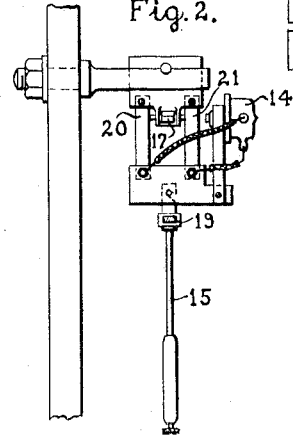
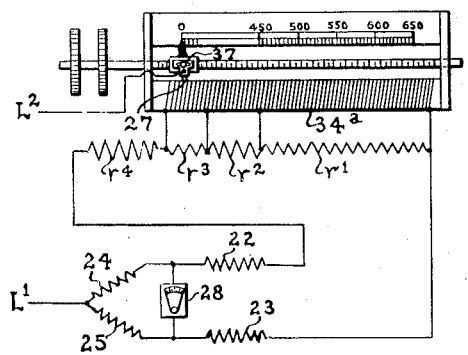
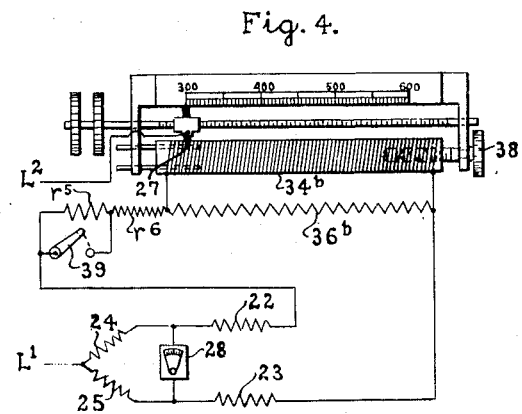
Inventor
Horace N. Packard
By ~~Faulkner & Hubbard~~
Attorney

Patented Jan. 18, 1927.

1,614,535

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

MEANS FOR INDICATING AND ALSO RECORDING VARIOUS VALUES.

Application filed February 5, 1921. Serial No. 442,695.

This invention relates to means for indicating and also recording various values.

While not limited thereto, the invention is particularly applicable as a distant indicator, or recorder, of the manner and degree in and to which an element is adapted to change certain of its electrical characteristics under varying conditions tending to influence such characteristics.

In my prior pending application Serial Number 347,227, filed Dec. 24, 1919, is disclosed a recording calorimeter wherein a pair of resistance thermometers are subjected to temperatures whose difference is caused to vary as a function of the value to be recorded, the resultant change in relative ohmic value of said resistance thermometers being utilized for controlling operation of a marker which in turn is adapted to co-operate with a clock driven chart or record blank for recording, and indicating, continuously the successive values of such temperature difference.

The present invention has among its objects that of providing modified apparatus for the foregoing and other purposes possessing certain advantages over such former apparatus.

Another object is that of providing such apparatus which is applicable, without modification or with but slight modification, to widely different classes of service.

Another object is that of enlarging the scale of the indication or recording of such apparatus within given or desired ranges, without corresponding increase in physical dimensions of such apparatus.

Another object is that of providing such apparatus which may be readily adapted to indicate or record on such enlarged scale in any given or desired portion of the entire working range.

Other objects and advantages will hereinafter appear.

In the accompanying drawing wherein are illustrated certain of the embodiments which the invention may assume in practice, Figure 1 is a schematic and diagrammatic illustration of such apparatus;

Fig. 2 is an enlarged detail view of the timing mechanism; while,

Figs. 3 and 4 are similar detail views illustrating slightly modified constructions of the recorder.

Referring to Fig. 1 of the drawing, the same illustrates an indicating and recording device comprising, in its essential aspects, an element 5 mounted upon a screw shaft 6 and co-operating therewith for effecting lateral movement of the former upon rotation of the latter. Opposed ratcheting devices having individual operating solenoids 7 and 8 provide for operation of said screw shaft in opposite directions. A pointer 9 and a marker 10 are carried by the element 5, the former to co-operate with a fixed scale 11 for indication and the latter to coact with a movable chart or record blank 12 for recording instantaneous positions of said element. Said chart is provided with operating means including a ratcheting device having an operating solenoid 13. Obviously the aforedescribed indicating elements may be omitted if desired since the recording elements inherently indicate continuously.

A pendulum operated switch 14 serves to effect periodically timed energization of the chart operating solenoid 13 to thereby effect accurately time controlled movement of the chart. Also said switch serves, in conjunction with instrumentalities to be hereinafter described, to provide for selective energization of solenoids 7 and 8 for timing operation of the element 5 carrying the aforedescribed pointer and marker.

The switch 14 and the time controlled operating means therefor are preferably in many respects similar to the corresponding elements disclosed in my prior pending application Serial Number 385,125, filed May 29, 1920. Moreover, the switch itself is preferably similar to that disclosed and claimed in a pending application of Erwin R. Stoekle, filed May 17, 1920, Serial Number 381,792.

More specifically said switch operating device as illustrated in Figs. 1 and 2 comprises a pendulum 15 and an operating electromagnet 16 therefor. The switch 14 which controls energization of said electro-magnet and which is of a construction adapting the same to make and break circuit respectively upon partial rotation thereof in opposite directions, is mounted directly upon the pendulum for oscillation therewith. Moreover, the switch is of such character and construction that, upon simple oscillation thereof throughout a range sufficient for effecting the aforedescribed circuit control there occurs no material mass displacement thereof with reference to the force of gravity. Hence said switch is mounted to oscillate about an axis substantially coincident with the axis of oscillation of the pendulum, and when so mounted exerts no appreciable direct influence upon the motion of the latter. The switch is further designed and adapted to make and break circuit solely between fluid contacts, ordinarily comprising liquid mercury, and is thus especially adapted to the control of relatively heavy currents.

Said electro-magnet is preferably stationary and provided with an armature 17 to be lifted thereby, the latter being hinged to the pendulum support at a point closely adjacent to the axis of oscillation of the pendulum. A stop 18 serves to limit downward movement of said armature. An arm 19 is carried by and rigidly secured to the pendulum within the path of downward movement of said armature whereby upon de-energization of the electro-magnet and consequent release of said armature the latter is adapted to impart a gravity induced blow or impulse to the pendulum for promoting oscillation thereof. The pendulum thereupon swings to the left rocking the switch 14 in a like direction, and at a given angular position of said switch the energizing circuit of the electro-magnet 16 is re-established and the armature 17 again raised. The pendulum, however, continues to move to the left and thereafter moves to the right and substantially at the end of such latter movement said switch is caused to interrupt the energizing circuit of said electro-magnet. Thereafter the armature 17 again falls, subject to a brief time element due to residual magnetism of the electro-magnet 16 and during which interval the pendulum is adapted to complete its movement to the right and begin moving to the left, whereupon the aforedescribed cycle is repeated.

The foregoing construction and arrangement thus serve to render the impulses imparted to the pendulum of uniform value irrespective of variations in pull of the electromagnet 16 or other conditions tending to render the value of such impulses inconstant.

Thus the pendulum in swinging actuates the switch for opening and closing the circuits controlled by the latter at accurately timed intervals. Moreover, the aforedescribed ability of the switch to control relatively heavy currents enables the same to effect direct and joint energization control of the clock electro-magnet 16 and the chart solenoid 13 together with certain additional electro-responsive devices to be hereinafter described.

The pendulum is, in practice, preferably carried by a pair of electrically insulated conductive springs 20 and 21 which not only provide a resilient support for the pendulum itself but also afford means for effecting electrical connections between the movable switch parts and the stationary portions of the controlled circuit.

In addition to the aforedescribed instrumentalities, the operating and control means for the recorder pointer and marker comprise the devices now to be described.

A pair of resistances 22 and 23, composed of material which is adapted to change its ohmic value consistently with temperature changes, are arranged to be subjected respectively to temperature conditions which will ordinarily differ from one another. Thus said resistances will ordinarily assume the form and functions of so-called resistance thermometers and will therefore be herein regarded as such, except where a different intent is indicated.

Said resistance thermometers together with fixed resistances 24 and 25 are connected in the manner of a Wheatstone bridge. A balancing rheostat indicated generally at 26 is also included in the bridge connections between said resistance thermometers and provided with a line connected shiftable slider 27 for proportioning the resistance of the rheostat between the branches of the bridge.

In practice the slider 27 is mounted upon and movable with the element 5 of the recorder.

The opposite line connection of the bridge is made, as illustrated, between the fixed resistances 24 and 25.

A galvanometer 28 is connected in the aforedescribed Wheatstone bridge and provided with an oscillatable needle 29 to be deflected from its medial or neutral position upon unbalancing of the bridge and in a direction and to a degree corresponding and proportional to the character and degree of such unbalance.

A contacting device 30 having an operating solenoid 31 serves periodically to clamp the galvanometer needle 29 in its instantaneous assumed position for establishing electrical connections selectively determined by such positioning of the needle, the latter, during the intervals between successive clampings, being free to move under the influence of the Wheatstone bridge.

Said switching device serves, in conjunction with a ratchet operated contact drum 32 having an operating solenoid 33, whose energization is controlled and timed by the pendulum operated switch 14 aforedescribed, to control energization of the operating solenoids 7 and 8 of the screw shaft 6.

Thus under normal operating conditions, the pendulum acts continuously to maintain its own motion and to effect regularly timed actuation of the record 12 and contact drum 32 in synchronism therewith.

Assuming balancing of the Wheatstone bridge for a given relation of the temperature conditions to which the resistance thermometers 22 and 23 are subjected, any change in the relative temperature condition of said resistance thermometers will effect a corresponding proportional change in their relative ohmic values whereby the bridge becomes unbalanced and the galvanometer needle is deflected in a corresponding direction and to a proportional degree.

Thus assuming such a degree of unbalance of the bridge that the galvanometer needle is deflected to a position immediately below the extreme right hand upper contact of the contacting device 30, upon rotation of the contact drum to effect energization of the solenoid 31, said device is actuated to clamp the needle momentarily in such position and hence to effect energization of the aforementioned upper contact thereof. The circuit connections are such that upon energization of such contact the indicator solenoid 8 is selected for energization whereas owing to the arrangement of contacts upon the drum 32 said solenoid is thrice energized and de-energized prior to de-energization of the contactor solenoid 31, and subsequent release of the galvanometer needle. Such actuation of the indicator solenoid 8 serves to thrice actuate its associated ratcheting mechanism for shifting the element 5 together with the slider 27, pointer 9 and marker 10 a corresponding distance to the right thereby effecting a correspondingly large variation in apportionment of the resistance of rheostat 26 between the two branches of the Wheatstone bridge for restoring the balance of the latter and also indicating upon the scale 11 and marking upon the record blank 12 the degree and character of the adjustment thus effected.

Assuming a lesser degree of unbalance of the bridge such that the galvanometer needle is moved to a position beneath the middle contact of the right hand group of switch contacts, said indicator solenoid 8 is adapted to be twice energized and de-energized for effecting a correspondingly lesser degree of rheostat adjustment and also recording such adjustment. Upon unbalancing of the bridge in the opposite sense such as to effect deflection of the galvanometer needle in a direction opposite to that aforedescribed the indicator solenoid 7 is selected for energization and is similarly energized and de-energized a number of times corresponding to the degree of such deflection.

Here it may be noted that the illustrated circuit connections serve to provide against breaking of circuit at the galvanometer needle, such function on the other hand being performed by the contact drum 32 which is of such rugged construction as to withstand the results of such action without detriment. Also it is to be observed that in each instance energization of the indicator solenoid is timed by the contact drum, the action of which, as well as that of the chart, is in turn timed directly by the pendulum operated switch whereby the action of all of the aforedescribed instrumentalities is definitely timed and synchronized.

The rheostat 26 which is of special construction comprises essentially a slide wire resistance element 34 to co-operate directly with the slider 27 whereas for reducing the necessary travel of said slider, said resistance element is preferably coiled in the form of a helix about a suitable cylindrical insulating member 35, the space between successive turns of said helix being maintained substantially constant for obvious reasons. Moreover, the high degree of sensitiveness required of the Wheatstone bridge necessitates that the effective ohmic value of the rheostat be relatively low whereas for mechanical reasons it is necessary or highly desirable that the aforementioned resistance element 34 be constructed of rugged material whose ohmic value per unit length will ordinarily be materially higher than is suitable for the present purpose. For the foregoing reasons, among others, it is desirable in practice to shunt the element 34 as illustrated by means of a further resistance element 36 of relatively low ohmic value. Such expedient serves to reduce the effective ohmic value of the rheostat as regards apportionment of such value between the two sides of the Wheatstone bridge while maintaining substantial uniformity of the apportioning action effected by equal distances of travel of the slider 27. Although under these conditions the total ohmic value of the bridge including the rheostat will vary for different positions of the slider, such variation in no wise impairs the accuracy of the results attained so long as the aforementioned constant relations are maintained.

In construction of the Wheatstone bridge for certain purposes it is customary and desirable to make the resistance thermometers 22 and 23 of the same ohmic value for like temperature conditions and also to construct the fixed resistances 24 and 25 of the bridge of equal ohmic value whereby the bridge may be balanced under such conditions by apportioning the total effective resistance of the rheostat 26 equally between the two sides of the bridge.

However, particularly in calorimetry and allied arts wherein a high degree of sensitiveness of the apparatus, together with a high degree of refinement of the effected indication or recording, is required, it is not feasible to provide for such refined indication or recording throughout the entire range from zero indication to the upper limit thereof. Hence it has heretofore been the practice to provide a different apparatus, or at least to specially construct and calibrate the chief elements of the apparatus for each particular class of service or for each particular range within a given class of service.

For overcoming such difficulties the modified constructions of the balancing rheostat illustrated in Figs. 3 and 4 have been developed and the same will now be described it being understood that said figures comprise merely detail views of the particular parts which have been modified, the remaining portions of the device having been omitted for purposes of simplicity.

Referring to Fig. 3, the same illustrates such a modified form of balancing rheostat together with indicating means which are in general similar to those aforedescribed, the recording elements being omitted although obviously the same may be readily included.

In such rheostat the slide wire element $34^a$ and its cooperating slider 27 are practically identical with the corresponding elements aforedescribed. The low resistance shunt, however, and the manner of connecting the same to said slide wire element have been modified.

In the present instance said resistance shunt is composed of three distinct but series connected sections $r^1$, $r^2$ and $r^3$, each shunting a corresponding value of the slide wire element $34^a$. The sections $r^1$ and $r^3$ have ohmic values bearing the same ratio as the ohmic values of their corresponding sections of resistance $34^a$ thereby equalizing the values of resistance variation effected by like degrees of movement of the slider 27 in either of the corresponding sections of the element $34^a$. The effective resistance per unit length of intermediate section $r^2$ is materially higher than that of the sections $r^1$ and $r^3$ aforementioned. A fixed resistance $r^4$ is also arranged to be in series with the rheostat.

In practice the effective ohmic values of the aforementioned rheostat sections are such that the sum of resistance $r^4$ plus one-half of the effective resistance determined by the shunt section $r^3$ is equal to the sum of the effective resistance determined by shunt sections $r^1$, $r^2$ and by one-half of the section $r^3$.

Thus under the aforementioned conditions of the bridge wherein the resistance thermometers are subjected to like temperatures, the bridge will be in balance when the slider 27 is located midway of that section of the slide wire elements which is shunted by the section $r^3$ and hence such position of the slider should correspond with the zero line of the scale. If the pointer does not indicate zero when the bridge is so balanced, as indicated by the position of the galvanometer needle, the pointer may be adjusted relatively to the scale and slider by means of a screw 37 to cause the same to indicate zero. Since the respective steps of that section of the slide wire resistance which is shunted by the resistance section $r^3$ are of the same value as the steps which are shunted by the section $r^1$, the device is adapted to act similarly within the two aforementioned ranges. However, since the shunt section $r^2$ is of relatively high ohmic value, movement of the slider within the range determined by said latter shunt section will produce relatively greater resistance varying effects than the same degree of movement within the two ranges aforementioned. It thus results that the device may be very accurately adjusted to the zero point and is thereafter adapted to effect indications on a similarly enlarged scale throughout the desired limited range of operation remote from the zero point, whereas between the two aforementioned ranges, where indication is not required, the scale of the regulation is concentrated, or might even be suppressed altogether. The arrangement thus provides for indicating throughout the desired range upon a materially expanded scale without corresponding enlargement of the physical dimensions of the device.

Obviously by substituting, for the aforedescribed rheostat and scale, similar elements having slightly different characteristics the range of refined indication may be varied to suit widely differing conditions of service.

A still further refinement of the indication without increase in physical dimensions of the device may be effected by further modification of the rheostat in the manner illustrated in Fig. 4. In this instance the slide wire element $34^b$ and shunt resistance $36^b$ are similar to the corresponding designated elements of Fig. 1.

Here, however, said rheostat elements are constructed to extend a material distance beyond the fixed scale at both ends. Moreover, the rheostat is mounted to provide for axial adjustment thereof relative to the scale and slider by means of a screw 38.

Also the external fixed resistance roughly corresponding to the resistance $r^4$ of the preceding figure is divided into two sections $r^5$ and $r^6$, the ohmic value of section $r^5$ being somewhat higher than that of section $r^6$ and the former being provided with a short-circuiting switch 39. The effective ohmic values of the aforedescribed resistances are such that, $$r^5 = r^6 \pm r(36^b).$$

That is to say, under conditions of zero temperature difference of the resistance thermometers, the bridge will be in balance if the current feed thereto be located at the junction of resistance sections $r^5$ and $r^6$, which relation is not permitted by the present structure. However, upon closure of the switch 39 and consequent short-circuiting of resistance section $r^5$, the conditions are so changed that the balancing position of the slider 27 will occur at about the point illustrated, viz, near the end of the slide wire element corresponding with the lowest scale value.

If, when the bridge has been so balanced, the pointer does not exactly coincide with the lowest scale value the rheostat is then adjusted axially by means of the screw 38 until the balancing point accurately coincides with such point upon the scale.

Upon opening the switch 39 the device is adapted to indicate temperature differences of the resistance thermometers accurately within the range indicated by the scale.

By this construction and arrangement, the desired range of indication may be expanded to cover the entire length of the scale, no portion of the latter being required to cover the range between the zero point and the beginning of the desired range.

The device substantially as illustrated in Fig. 1, either with or without modification in the manner indicated in the other figures, is particularly adapted for use in calorimetry of gases and in allied arts. However, such device is also capable of advantageous application in many other relations.

Thus if the resistance thermometers 22 and 23 be installed in a calorimeter of the general character disclosed in my aforementioned copending application, the recorder becomes a recording calorimeter for indicating and recording B. t. u. values of a combustible gas.

On the other hand, one of such resistance thermometers may be replaced by an element of fixed resistance and the other resistance thermometer subjected to temperature conditions the values of which it is desired to ascertain. In this case the recorder becomes a recording thermometer for indicating and recording the values and variations of such temperature conditions.

Again if the resistance thermometers be replaced respectively by a fixed resistance and a rheostat whose resistance can be varied mechanically, the recorder may be made to indicate the position or condition of a remote movable device mechanically coupled with the movable member of such rheostat. The device might then indicate the condition of an important valve, whether open, closed or the extent of any partial opening; or the position of a gas holder; or the rise and fall of a water level; or the pressure or change in pressure of a medium; or the speed of a rotating engine or machine. Various other applications are apparent whereby distant indications may be made through utilization of variations in electrical condition of an element as described.

By paralleling the solenoids 7, 8 and 13 with similar solenoids it is possible to obtain a duplicate record, and this duplicating apparatus would be considerably cheaper and simpler than the master apparatus.

As many of these duplicating instruments as desired can be operated from the one master instrument. Moreover, this electric clock or timing device can be made use of for timing or operating other relays or apparatus requiring an accurate timing control, without interfering with its operation on the recorder.

What I claim as new and desire to secure by Letters Patent is:

1. In a recorder, the combination with a record blank and a marker, of operating means for effecting relative movement of said blank and marker and means for timing operation of said former means comprising a pendulum and electro-responsive means adapted, following each response thereof, to impart to said pendulum a gravity induced impulse to promote oscillation thereof.

2. In a recorder, the combination with a record blank and a marker, of electro-responsive means for effecting relative movement of said blank and marker and means for timing operation of said former means comprising a pendulum and electro-responsive means adapted, following each response thereof, to impart to said pendulum a gravity induced impulse to promote oscillation thereof and means subjecting said first-mentioned and said second-mentioned electro-responsive means to time control by said pendulum.

3. In a recorder, the combination with a record blank and a marker of individual operating means therefor, and means for timing operation of said former means comprising a pendulum and electro-responsive means adapted following each response thereof to impart to said pendulum a gravity induced impulse to promote oscillation thereof.

4. In a recorder, the combination with a record blank and a marker of electro-responsive individual operating means therefor, and means for timing operation of said former means comprising a pendulum and electro-responsive means adapted following each response thereof to impart to said pendulum a gravity induced impulse to promote oscillation thereof, and means subjecting all of said electro-responsive means to time control by said pendulum.

5. In a recorder the combination with a record blank and a marker, of operating means for said record blank and means for timing the action of said operating means comprising a pendulum and electro-responsive means subjected to time control by said pendulum and adapted, following each response to impart thereto a gravity induced impulse for promoting oscillation thereof, operating means for said marker comprising a Wheatstone bridge having associated elements for determining the extent of operation of the marker and means subjected to time control of said pendulum for timing action of said marker operating means.

6. In a recorder, the combination with a record blank and a marker, of individual step by step operating means therefor, control means for said marker operating means comprising a Wheatstone bridge, a contacting device subjected to influence by said bridge for selecting given degrees of actuation of said marker, and means for effecting joint time control of said individual operating means comprising a pendulum and electro-responsive means to impart an impulse to said pendulum to promote oscillation thereof.

7. In apparatus of the character set forth, in combination, a plurality of circuits, a rheostat having an element movable to divide the resistance thereof between said circuits in different proportions to compensate for relative variations in certain of the electrical conditions of said circuits and additional resistance associated with said rheostat for adjusting the compensating effect of certain increments of movement of said rheostat element whereby an increased proportion of the total number of increments of movement of said element may be utilized to compensate for such variations within a given range.

8. In apparatus of the character set forth, in combination, a plurality of circuits, a rheostat having an element movable to divide the resistance thereof between said circuits in different proportions to compensate for relative variations in certain of the electrical conditions of said circuits and additional resistance associated with said rheostat for enabling an increased proportion of the total number of increments of movement of said rheostat element to be utilized to compensate for such variations above a given value and to effect the desired initial adjustment of said circuits relative to one another.

9. In apparatus of the character set forth, in combination, a plurality of circuits, a variable resistance, means responsive to relative variations in certain of the electrical conditions of said circuits to divide said resistance between the latter for compensation of such variations, said means including a controlling element for said resistance having a limited range of movement and means rendering the range of movement of said element proportionally greater for a given range of such variations than for a different range of such variations.

10. In apparatus of the character set forth, in combination, a plurality of circuits, a rheostat having an element movable in response to relative variations in certain of the electrical conditions of said circuits to divide the resistance of said rheostat between said circuits in different proportions to compensate for such variations, additional resistance associated with said rheostat for enabling an increased proportion of the total number of increments of movement of said rheostat element to be utilized to compensate for variations within a given range of such variations, a scale, a pointer carried by said rheostat element for indicating upon said scale the position of said element with respect to a reference position, and means providing for relative adjustment of certain of said devices for causing such reference position to correspond to a predetermined value of such variations.

11. In apparatus of the character set forth, in combination, a plurality of circuits, a rheostat having an element movable to divide the resistance thereof between said circuits in different proportions to compensate for relative variations in certain of the electrical conditions of said circuits, additional resistance associated with said rheostat for adjusting the compensating effect of certain increments of movement of said rheostat element whereby an increased proportion of the total number of increments of movement of said element may be utilized to compensate for such variations within a given range, and means to vary the value of said additional resistance included in circuit to thereby shift the range of such variations to be so compensated to different portions of the entire range of such variations.

12. In apparatus of the character set forth, in combination, a resistance, a plurality of circuits to be controlled thereby, means responsive to varying electrical conditions in said circuits to divide said resistance between said circuits in different proportions to compensate for such varying conditions, said means including an element movable to different positions with reference to said resistance to so control said circuits, said resistance being arranged with reference to said element to provide for like degrees of resistance proportioning action upon similar degrees of movement of said element within certain discontinuous portions of its range of movement and a higher value of such proportioning action upon the same degree of movement of said element within an intermediate portion of its range of movement.

In witness whereof, I have hereunto subscribed my name.

HORACE N. PACKARD.